(12) United States Patent
Schmidt (10) Patent No.: US 7,357,351 B2
(45) Date of Patent: Apr. 15, 2008

(54) LINEAR SHOCK WAVE ABSORBER

(75) Inventor: Eric T. Schmidt, 524 Commerce, Wichita, KS (US) 67202

(73) Assignee: Eric T. Schmidt, Wichita, KS (US)

( * ) Notice: Subject to any disclaimer, the term of this patent is extended or adjusted under 35 U.S.C. 154(b) by 116 days.

(21) Appl. No.: 11/063,314

(22) Filed: Feb. 21, 2005

(65) Prior Publication Data

US 2006/0102789 A1    May 18, 2006

Related U.S. Application Data

(63) Continuation-in-part of application No. 10/198,369, filed on Jul. 18, 2002, now abandoned.

(51) Int. Cl.
  *B64C 1/40* (2006.01)
  *B64C 23/00* (2006.01)
  *B64C 9/16* (2006.01)
  *B64C 1/38* (2006.01)

(52) U.S. Cl. ............... 244/1 N; 244/210; 244/130; 244/211; 244/123.1; 244/207

(58) Field of Classification Search ............ 244/210, 244/211, 130, 1 N, 200, 207–209, 123.1
See application file for complete search history.

(56) References Cited

U.S. PATENT DOCUMENTS

| | | | | | |
|---|---|---|---|---|---|
| 1,414,418 | A | * | 5/1922 | Jaray | 416/94 |
| 1,513,241 | A | * | 10/1924 | Harding | 244/209 |
| 1,631,259 | A | * | 6/1927 | Gilmore | 244/214 |
| 2,069,047 | A | * | 1/1937 | Ray | 244/8 |
| 2,136,403 | A | * | 11/1938 | Vance et al. | 244/198 |
| 2,169,325 | A | * | 8/1939 | Novak | 244/198 |
| 2,177,887 | A | * | 10/1939 | Huet | 105/1.1 |
| 2,220,420 | A | * | 11/1940 | Meyer | 416/90 R |
| 2,441,279 | A | * | 5/1948 | McCollum | 165/41 |
| 2,507,611 | A | * | 5/1950 | Pappas et al. | 244/198 |
| 2,899,150 | A | * | 8/1959 | Ellis, Jr. | 244/200 |
| 2,915,136 | A | * | 12/1959 | Ringleb | 181/213 |
| 3,000,401 | A | * | 9/1961 | Ringleb | 138/39 |
| 3,366,348 | A | * | 1/1968 | Lemoigne | 244/200 |

(Continued)

*Primary Examiner*—Michael J. Carone
*Assistant Examiner*—Joshua Michener (57) ABSTRACT

A linear cavity is provided on the leading edge of an object that is subject to the flow of liquids or gasses, where said cavity preferably has a wall that follows the curvature of a diminishing sine wave, although other configurations are possible that do not follow a specific sine wave. The cavity accepts the flow of liquids or gasses that enter into the cavity, and where the dimensions of the cavity cause the flow of liquids or gases within it to form a pressure node that extends forward of the cavity. The pressure node provides a wedge means to cause oncoming gasses or liquids to divert around the object body ahead of the object body itself, decreasing turbulence around the periphery of the object. The cavity may be spherical, in the instance of a missile, plane, or underwater transportation means, or may be linear, in the instance of an automobile grill that is subject to wind, or a bridge support, where the bridge support has to maintain position against the flow of current. The cavities may also be defined only on the ridge or leading edge, or concurrently on the ridge leading edge and the rear aft edge of the object to allow efficient movement both forward and aft.

2 Claims, 5 Drawing Sheets

U.S. PATENT DOCUMENTS

| | | | |
|---|---|---|---|
| 3,507,463 A * | 4/1970 | Kuntz | 244/199.1 |
| 3,542,486 A * | 11/1970 | Adiutori et al. | 416/90 R |
| 4,378,097 A * | 3/1983 | Ferguson et al. | 244/53 B |
| 4,399,970 A * | 8/1983 | Evans | 244/214 |
| 4,422,606 A * | 12/1983 | Munroe | 244/203 |
| 4,522,357 A * | 6/1985 | Bains et al. | 244/3.22 |
| 4,573,648 A * | 3/1986 | Morenus et al. | 244/3.22 |
| 4,650,138 A * | 3/1987 | Grose | 244/130 |
| 4,736,912 A * | 4/1988 | Loebert | 244/130 |
| 4,759,516 A * | 7/1988 | Grose | 244/130 |
| 4,907,765 A * | 3/1990 | Hirschel et al. | 244/200 |
| 4,962,903 A * | 10/1990 | Byron | 244/117 A |
| 5,449,136 A * | 9/1995 | Doria Iriarte | 244/199.1 |
| 5,836,549 A * | 11/1998 | Bushman | 244/203 |
| 6,050,523 A * | 4/2000 | Kraenzien | 244/123.1 |
| 6,161,802 A * | 12/2000 | Cunningham, Jr. | 244/199.1 |
| 6,464,171 B2 * | 10/2002 | Ruffin | 244/130 |
| 6,857,604 B2 * | 2/2005 | Schmidt | 244/130 |
| 2006/0102789 A1 * | 5/2006 | Schmidt | 244/130 |

* cited by examiner

LINEAR SHOCK WAVE ABSORBER

This is a continuation in part of application Ser. No. 10/198,369 filed Jul. 18, 2002, now abandoned (Shock Wave Absorber), and Ser. No. 10/198,369 (shock Wave Absorber), inventor Eric Schmidt.

No Federally sponsored research or development.

No incorporation-by-reference materials are included with this application.

BACKGROUND OF THE INVENTION.

Air resistance provides a formidable barrier to objects moving at high rates of speed. There have been numerous efforts to minimize the effects of moving air over and around a cylindrical body. It is not only the air that must be pushed aside in order for the body of a cylindrical object to move freely through the air, but air resistance and drag may also be caused by turbulence against the outer skin of a cylindrical body, which diminishes aerodynamic design benefits. When considering the reduction of drag on a leading edge of a moving object, the shape and configuration of the foremost section of the leading edge, is an important aspect to minimizing the resistance of the air of fluid moving around said leading edge.

Allowing a smooth air airflow around a surface area is well-recognized as a means to reduce drag. For example, in U.S. Pat. No. 4,989,807 (Foreman et al.), the injection of an airflow in the bent portion of an s-shaped air intake allows the airflow to be uniform and minimizes pressure drops within the air intake duct. This is a result of the circulating effect of air between the airflow and the inner walls of the duct, where the injected air actually provides a cushion between the high rate of flowing air and the duct wall.

High speed projectile technology for items moving through water have encompassed the idea that the shape of the nose may be done in a manner so as to provide a cavitation bubble around the body of the projectile so as to reduce hydro-dynamic drag. This is example in U.S. Pat. No. 5,955,698 (Harkins et al.).

U.S. Pat. No. 4,522,357 (Bains et al.) And U.S. Pat. No. 4,573,648 (Morenus et al.) examples an attempt to take advantage of the air moving around a high-speed object for purposes of guidance. In this invention, an air inlet is provided in the nose of a missile, where the air moving through the air inlet is directed to a specific outlet port that assists in guiding the missile.

U.S. Pat. No. 3,995,558 (Travor et al.) examples the type of effort given to use an air intake having an inlet port and outlet ports where onrushing air is allowed to move through the nose down in such a manner that will provided a laminar boundary area of air between the body of the object and the air it is moving through. This cuts down on overall resistance. The ports themselves allow air to be projected rearward along the sides of the object, and attempt to provide a secondary cushion of air between the atmosphere and the skin of the object.

A recent usage of cavities on the leading edge of airplane wings, and/or propellers, is disclosed in U.S. Pat. No. 5,836,549 (Bushman), in which a cylindrical cavity is defined along the forward edge of a wing or propeller. The cavity is intended only for supersonic speeds, and does not rely on any defining characteristics of using sine wave formation to define the shape and structure of the linear cavity as the present invention does. The Bushman patent utilizes what is effectively half of a cylinder volume to define their cavity, and only disclose a cavity wall that follows a uniform arcual curvature. The present invention defines an open mouth that defines an opening to a cavity within the structure itself, whose circumference exceeds the opening itself. The present cavity is useful for slower speeds, as well as for usage in water and other liquids. Also, the present invention takes advantage of possible multiple cavities, which are neither disclosed or alluded to in the Bushman patent.

The present invention does not use a separate air outlet, but uses the shape of a linear cavity to cause fluid or gas moving toward it to be redirected outward, so as to create a central high pressure ridge that projects outward from the opening of the linear cavity. This ridge, or what may also be considered a linear pressure spike directs oncoming air around the body of the leading edge.

Prior art does not teach the use of a pressure spike to direct oncoming air flow, nor does it teach multiple chambers, which may be used to encourage rapid creation of the pressure spike within the largest or primary chamber. This also prevents the pressure spike from rapidly dissipating during movement through the air. The cavities defined in this invention are also useful with regard to movement through air or any gas, as well as through water or any liquid, since the cavity chamber can provide a liquid pressure spike that allows the liquid in front of the nose of the object moving through the water more easily as the spike causes a cavitation ridge and stationary liquid such as water is able to be directed around the body of the object.

BRIEF SUMMARY OF THE INVENTION

The wings of aircraft, propellers, bridge supports, and other linear objects encounter resistance as a result of the difference in relative speed between the object and the gas or liquid through which it is moving, or where the gas or liquid is moving around it. Since the object must effectively move a portion of the gas or liquid around it as the gas or liquid moves past it, the gas or liquid creates drag as a result of the friction of the air against the outer skin of the object, but particularly against the leading edge of the object, such as the front edge of a wing, or the portion of a bridge support that is presented toward onrushing water. Certain amounts of drag can be reduced through aerodynamic design, but there exists a continuing problem with how best to direct gas or liquid initially at the front leading edge of the object so as to reduce friction.

This invention incorporates a linear cavity that is defined in the forward portion, also referred to as the front leading edge of the object, with said cavity defining an interior that is conducive to causing air to rotate within said cavity. Gas or liquid enters into the cavity as a direct result of the object's relative movement through the air. The gas or liquid enters initially as a result of an increase in pressure against the opening of the cavity as the object moves forward. Typically, this increase in pressure is along the length of the leading edge in a fairly uniform manner. As the relative speed of the object increases, a greater quantity of gas or liquid will be forced into the mouth of the cavity along its length. The shape of the cavity causes the gas or liquid moving against the wall of said cavity to encourage a linear rotation within said cavity. The rotation in a three-dimensional model causes a central ridge or central linear node of increased pressure, where said central node of increased pressure will be significant enough to cause gas or liquid in the central node to be expelled out of the mouth of the cavity along its length, creating a protruding linear pressure ridge or node.

The air that is expelled out of the cavity creates a pressure ridge that extends forward of the object. The distance of the extension of the pressure ridge is dependent on the speed of the object relative to the media though which it has a differing relative speed, and to the configuration of the cavity creating said pressure ridge.

The protruding pressure ridge causes the gas or liquid to begin to be redirected so as to move around the body of the object before it has a chance to physically impact the outer skin of the leading edge of the object. This reduces drag on the front part of the object, since the previously redirected gas or liquid has less turbulence caused by the object itself, as it begins to move around the object. The turbulence is lessened further by the pressure ridge which modifies the direction of air relative to the object using relative pressure differentials, as opposed to a physical barrier such as the outer skin of the object. Gas or liquid moving around the ridge or leading edge of the object has a significant drop in turbulence, which likewise reduces the overall drag.

The optimal shape of the cavity is dependent on the medium through which the object is traveling. Water presents a different criteria than does air, since the mass of the water is greater than the air, and the relative speed of the object through water is generally lower than the relative speed of an object through the air. Airborne objects encounter atmospheric pressure differentials at various altitudes, and this may also play a factor in determining the optimal cavity configuration. For example, an object intended to move at high altitudes with greater speed than an object at lower altitudes, will have different optimal cavity configurations. Objects in the water will exhibit a protruding wave ridge, in some aspects similar to the pressure wave ridge provided by the bow of a moving boat.

The cavity is defined by an opening centrally located on the leading edge of an object such as a wing or leading edge of a flap, propeller edge, support, pylon, or other similar structure. This would typically be a wing, or other support means, having a length that also defines a flattened side edge. The cavity itself is a linear trough, and generally spherical in design when viewed from a cross sectional viewpoint. The walls of the cavity may define a single linear cavity, having curved side walls, as well as multiple linear cavities, where the successive cavities are connected to each other. In this situation, the forwardmost cavity comprises the cavity with the largest volume, and where the back wall of the forwardmost cavity defines an opening that leads into a successive cavity having similar shape, but which is greatly reduced in size and volume as compared to the forwardmost cavity.

Where multiple cavities are provided, the initial cavity is preferably the largest in maximum circumference, with the successive cavities having a reduced circumference in relation to the successive status of the particular cavity.

The walls of the cavities, where multiple cavities are arranged from the largest to the smallest, the side walls preferably follow a diminishing sine wave orientation, when describing the side walls of the cavity in a cross-sectional orientation view. The sine wave comprises a wave form contained within a particular set of radii, where said radii have an angle in relation to a central zero degree vector. The zero degree vector preferably runs through the center of the object body from forward to aft, and defines the center point of each cavity defined within the object body.

While the walls of the cavity, when viewed from a cross sectional viewpoint, may define a single spherical shape. Multiple cavity walls follow a diminishing sine wave configuration. Therefore, multiple cavities may comprise two successive cavities, three successive cavities or more depending on the sine wave configuration used.

Successive cavities assist in promoting the rotational configuration in the cavity before it. The successive cavity operates in a similar manner as does the primary or foremost cavity, so that when a pressure ridge or node extends out of the secondary cavity, it will assist in promoting rotation of the air in the primary cavity, with a pressure node encouraged to develop outward through the opening.

Cavities may be defined on both the forward and aft ends of the object, and the cavities themselves may all be connected to each other through a vent defined between the forward and aft cavities.

It is an object of this invention to provide a means for reducing drag on a length of an object that contacts moving gas or liquid, whereby a high pressure node is projected outward from the forward portion along the length of the object that is intended for rapid movement through gas or liquid.

It is a further object of this invention to provide a means whereby a primary cavity has a secondary cavity situated therein, where the secondary cavity assists in the rotation of gas or liquid within the primary cavity, to rotate and form a central high pressure node that functions as a high pressure ridge along the length of the cavity.

It is a further object of this invention to provide a means whereby a modified leading edge, having a defined cavity, can be substituted on existing aircraft, missiles, or any other airborne or underwater objects that require higher levels of speed with reduced drag.

It is a further object of this invention to provide a means whereby a leading edge of an object can provide a forward projecting pressure node on a land vehicle, such as an automobile.

It is a further object of this invention to provide a means whereby a leading edge of an object can provide a forward projecting pressure node using a linear cavity, where the pressure node reduces turbulence for either stationary objects such as bridge supports, or on a land vehicles, such as automobile ends.

DETAILED DESCRIPTION OF THE INVENTION

Figure 1:
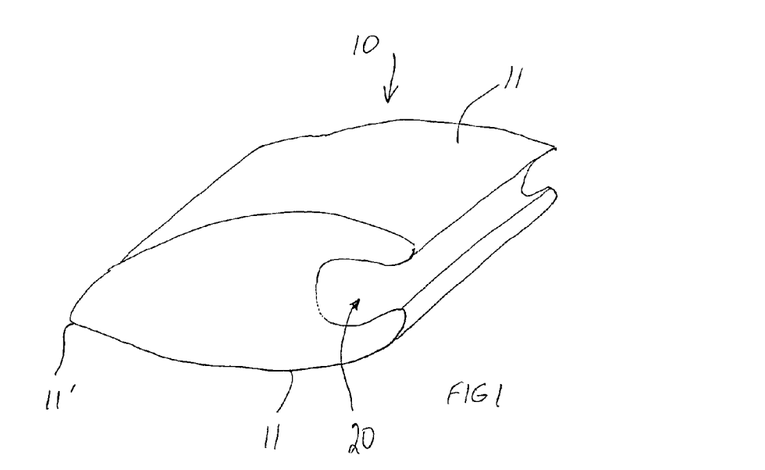
FIG. 1 is a perspective view of typical linear object, having a leading edge, intended for rapid movement through air or water.

Referring now to FIG. 1, a perspective view of a leading edge 10, where said leading edge 10 comprises a typical wing, pylon strut, or propeller. The leading edge 10 defines a back end 11', and a front end, where said front end comprises a mouth 48 that is defined as to opening size by an upper 47 lip and a lower 46 lip. The cavity 20 has a depth that exceeds the mouth opening size 48, and an internal circumference that also exceeds the size of the mouth 47. The typical forward edge of a wing is shown by dashed lines 49.

Figures 10, 11, 12, 13, 14:
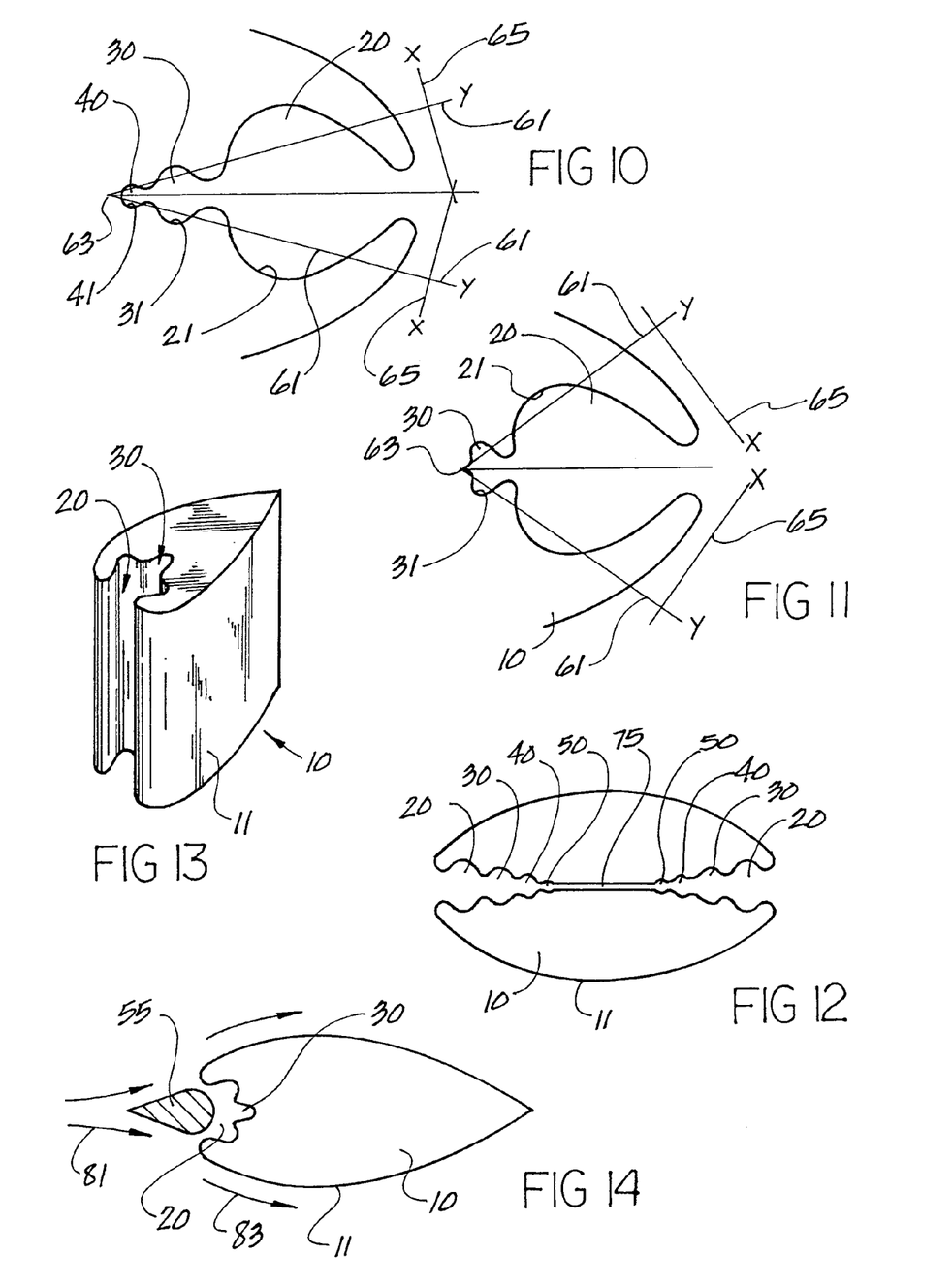
FIG. 10 is a cross sectional view of a leading edge having multiple cavities, in which the walls of the cavities are defined through the sine wave as shown in FIG. 8.
FIG. 11 is a cross sectional view of a leading edge having multiple cavities, in which the walls of the cavities are defined through the sine wave as shown in FIG. 9.
FIG. 12 is a cross sectional view of a leading edge having multiple cavities forward and aft, where the cavities are connected by a single vent.
FIG. 13 is a perspective view of an object such as a bridge support, having a cavity that causes a pressure node to extend forward of the cavity, where the cavity is linear rather than spherical.
FIG. 14 is a cross sectional view of the object shown in FIG. 13.

The dimensions of the cavity are further shown in FIG. 1, in which the measurable depth 43 of the cavity 20 exceeds that of the vertical height 44 of the cavity 20, and where both the depth 43 and height 44, exceed the space defined between the upper lip 47 and lower lip 46. It should be understood that the defining words regarding vertical and depth, when referring to the cavity 20, are being used with the orientation as shown in FIG. 1 through FIG. 12, which is the most common anticipated orientation. Where the leading edge 10 is orientated perpendicular, as shown in FIG. 13, the cavity 20 is also orientated perpendicular, however the terminology will still apply, if the cavity 20 is referenced in the same orientation as the rest of the Figures.

Figures 5, 6, 7, 8, 9:
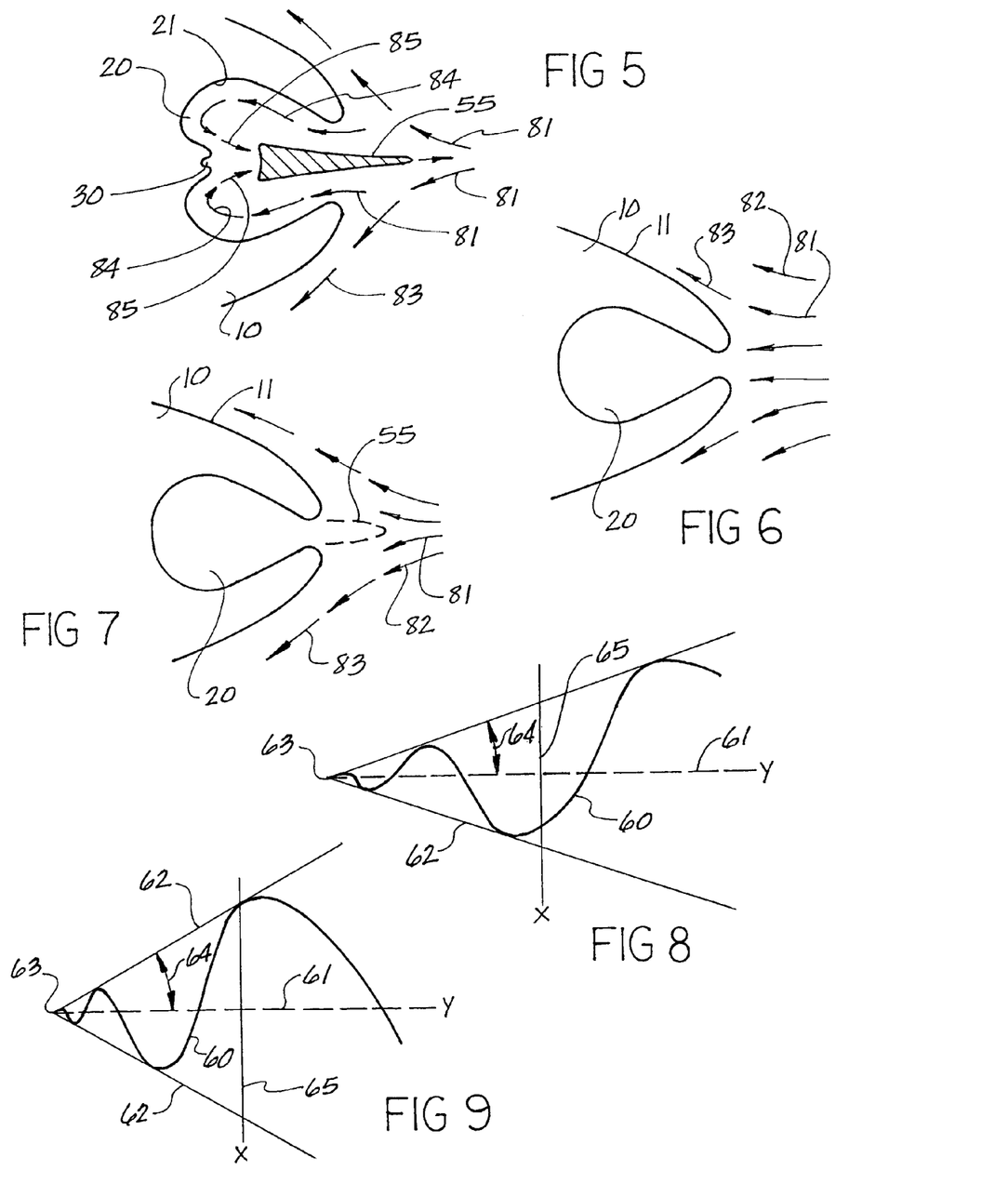
FIG. 5 is a cross sectional view of a leading edge depicting the flow of air, or water into the cavity with the high pressure node indicated as an elongated triangle that protrudes forward out above the cavity mouth.
FIG. 6 is a cross sectional view of the leading edge in which the moving air and/or water has not yet entered the cavity.
FIG. 7 is a cross sectional view of the leading edge in FIG. 6, in which the moving air and/or water is being diverted through a projecting high pressure node.
FIG. 8 is an example of a diminishing sine wave.
FIG. 9 is an example of a diminishing sine wave, having an angle of magnitude greater than the sine wave in FIG. 8.
Figures 5A, 15:
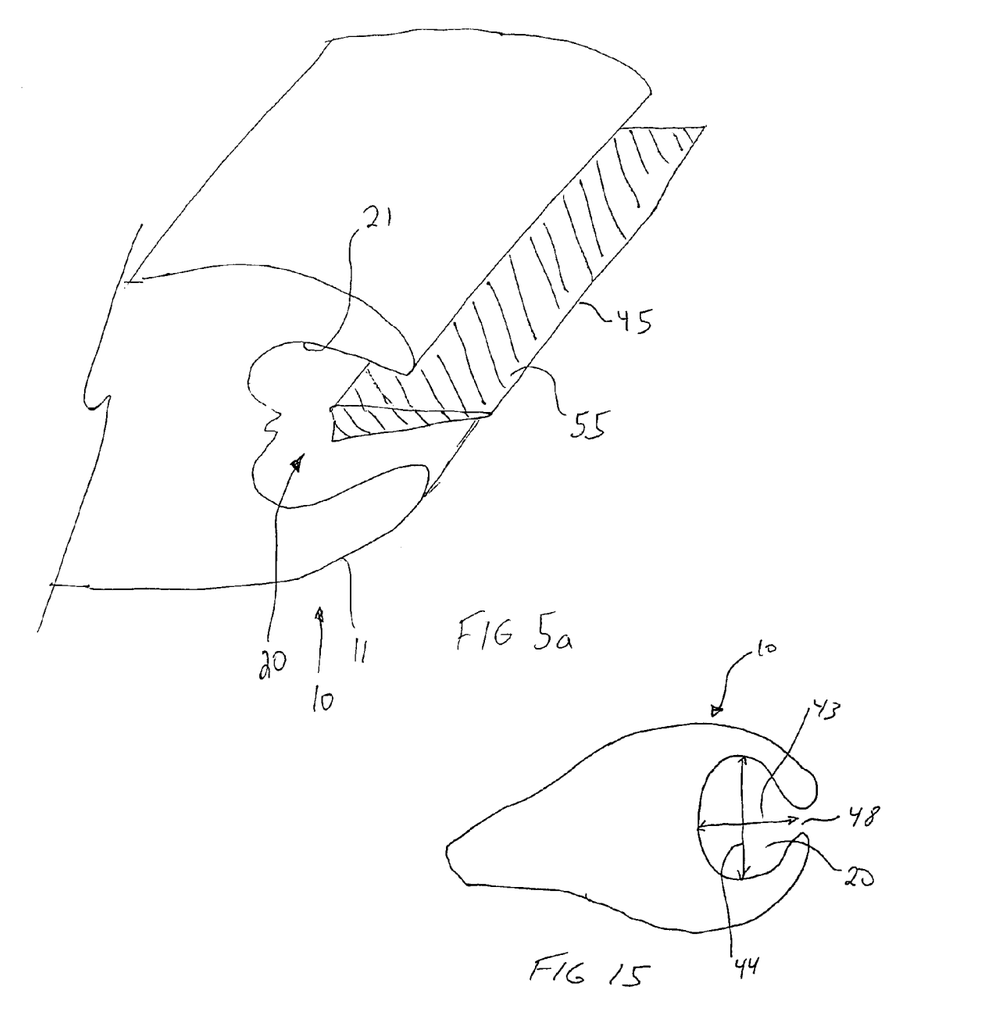
FIG. 5a is a perspective view of FIG. 5.
FIG. 15 is a cross sectional view showing proportionate dimensions of interior cavity.

Referring now also to FIG. 15, the height 44 is greater than the depth 43, defined within the cavity 20. This does not follow the sine wave formation described below, but is an alternative structural design that may be usable with different relative speeds of gasses and/or liquids.

Figure 2:
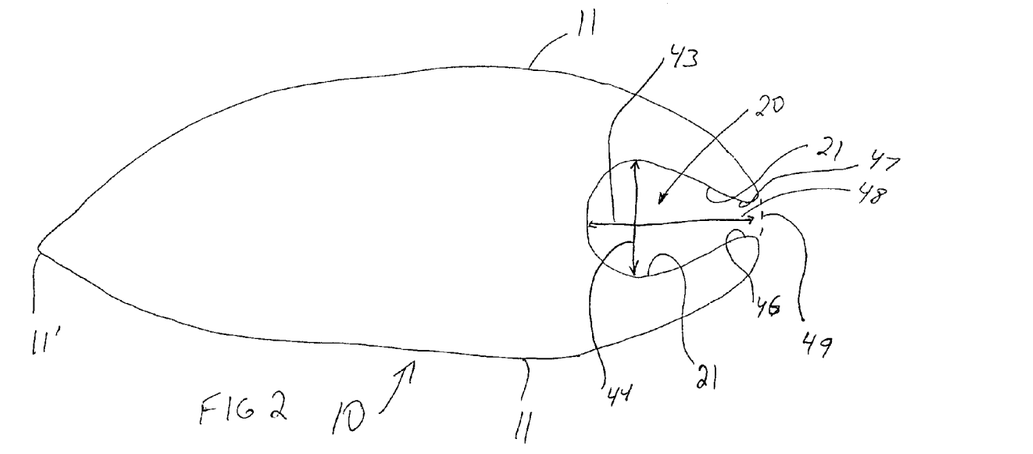
FIG. 2 is a cross sectional view of the typical linear object intended for rapid movement through air or water, as depicted in FIG. 1.

Referring to FIG. 2, a perspective view of the cavity 20 is shown. The cavity 20 would extend virtually the entire length of the forward leading edge of the wing, or other structure. Referring now to FIG. 6, a typical leading edge 10 is shown, with the direction of air in relation to the leading edge 10 also shown. It should be understood that reference to air and water are interchangeable with regard to the scope of this invention. This invention was intended for use on objects that are to move efficiently through air and/or water. Therefore, the terminology directed toward air should be understood to mean water as well. The term gas is also interchangeable with liquid.

As FIG. 6 shows, air directly in ridge of the leading edge 10 moves directly against the ridge leading edge of the leading edge 10. The leading edge skin 11 comprises the outer surface of the leading edge 10. As the moving air 81 impacts the leading edge of the leading edge skin 11, it is pushed to one side as a result of the physical impact of the leading edge skin 11. Redirected air 81 goes along the surface of the skin 11 following route 83. Air moving in close proximity to the skin 11 will react by creating some turbulence, which dramatically increases drag. Air 83 acts somewhat as a buffer in FIG. 6 between moving air 82 and skin 11. FIG. 6 shows a cavity 20, but the interaction of the air within said cavity 20 is not depicted in FIG. 6.

FIG. 7 depicts the same leading edge 10 as shown in FIG. 6. The cavity 20 is again depicted, but the movement of the air within the cavity 20 is further described below. FIG. 7 depicts a protruding high pressure node 55, comprising an area of air or water that has a higher pressure then the air or water around it. The difference in the effects of the existence of the high pressure node 55 are clearly seen in the different pathways the moving air takes. Moving air 81 now contacts the high-pressure node 55 in ridge of the leading edge 10, and is redirected as flow 83. The air flow 83 is not modified as to direction of flow by the skin 11 of the leading edge 10 as significantly in FIG. 7 as it is in FIG. 6. The air flow 83 will have less turbulence in the configuration shown in FIG. 7, as compared to a leading edge 10 without a protruding high pressure node 55. Therefore, the benefits of this invention are realized when the relative difference in speed between the leading edge 10 and the air 81 becomes significant enough to create a high pressure node 55.

Figures 1A, 2A, 3, 4:
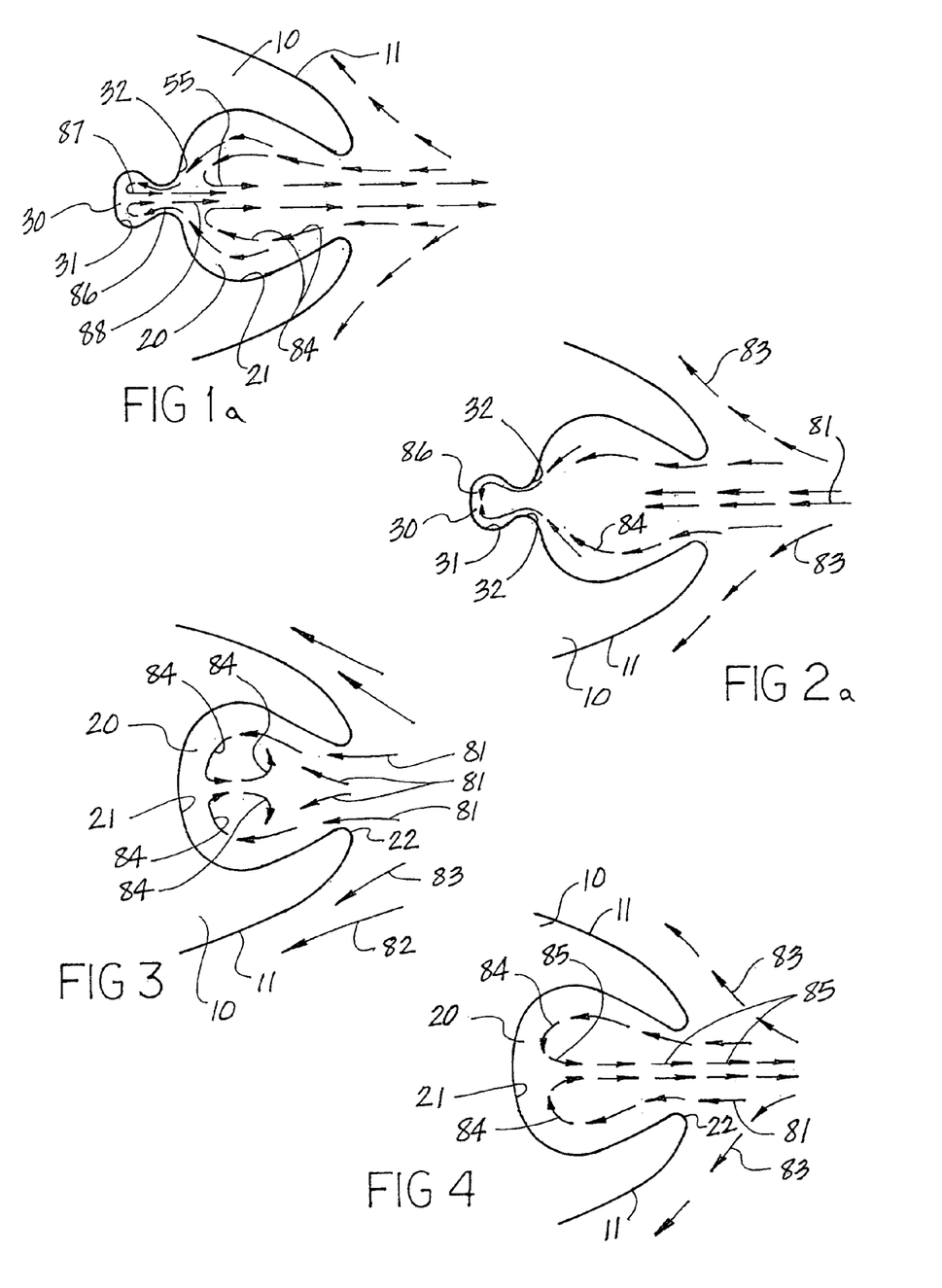
FIG. 1a is a cross sectional view of the linear object shown in FIG. 1, having a defined primary and secondary cavity with the direction of airflow through the cavity and around the nose cone shown, where a central higher pressure node is created projecting the high-pressure node forward of the leading edge.
FIG. 2a is a cross sectional view of the leading edge of the linear object depicted in FIG. 1, where the leading edge is moving at a lower speed relative to water and/or atmosphere, with the airflow or water flow into the cavity being at a lower rate than that shown in FIG. 1.
FIG. 3 is a cross sectional view of a leading edge having a single primary cavity, with the gas or water flow is a low rate, prior to a central high-pressure node being created within the cavity.
FIG. 4 is a cross sectional view of the leading edge, as shown in FIG. 3, where the leading edge is moving at a higher rate of speed and the flow of water or atmosphere through the cavity is sufficient to create a high pressure node in ridge of the leading edge.

Referring now to FIG. 3 and FIG. 4, a leading edge 10 is shown, and having a similar configuration to that shown in FIGS. 1a and 2. The cavity 20 is showing its most basic form, comprising a generally spherical shape that is slightly elongated as defined by the cavity wall 21 and where a circular mouth 22 defines the opening into the cavity 20.

As shown in FIG. 3, some of the air 81 moves into the cavity 20, while other air 82 and 83 is directed around leading edge 10. As air 81 moves into the cavity 20, the configuration of the cavity 20 will cause the air to begin to rotate as the air moving along the walls 21 of cavity 20 is forced to move from the outer area towards the central area the cavity 20. As the air begins to rotate, it will follow the circular rotational path 84. At this point, the movement of air within the cavity 20 has not yet had an opportunity to create a high-pressure node. Redirected air 82 continues to move past the leading edge 10 with air path 83 providing a turbulent buffer as it is compressed against the skin 11.

As the relative speed of the air and leading edge 10 increase in relation to each other, a higher pressure area or node is formed by the air 81 as it enters the cavity 20. The air pathway 81 follows the cavity wall 21 so that a circular rotation pathway 84 develops, and where all rotation pathways 84 meet, a node of higher pressure is created, and the air pathway 85, having a higher pressure than air existing outside the cavity 20, air pathway 85 will be pushed out of the cavity 20, exiting centrally through the circular mouth 22. The exiting air 85 briefly exhibits a pressure ridge node that extends forward of the mouth 22 of cavity 20. This causes a pressure projection that redirects air around the leading edge 10, following pathway 83, of the area of redirecting air and accomplished forward of the leading edge 10, so that redirected air 83 is subject to less turbulence and pressure against the skin 11 of leading edge 10.

Referring now also to FIG. 5, a pressure node 55 is shown, in relation to the cavity 20 and the cavity mouth 22. As is shown in FIG. 5, the pressure node 55 projects forward of the leading edge 10, in providing a wedge which causes oncoming air to be diverted. FIG. 5 also shows a secondary cavity 30, which will be discussed in detail below.

As FIG. 5a shows, a pressure node 55 extends along the length of the cavity 20. This pressure node 55 is in the general form of a wedge, and defines a protruding ridge at its most forward point 45. If the cavity 20 extends along the length of the structure, said cavity 20 will provide a pressure node 55 along the same length of the structure.

In some instances, a better shaped wedge, being the increased pressure node 55, is enhanced through the use of a secondary cavity 30, which assists in redirecting the rotational air 84 toward a central high pressure node area 55. FIG. 2a shows a leading edge 10 that has a primary cavity 20, with the rear most portion of its cavity wall 21 defining a secondary cavity mouth 32, which allows access into a cavity 30 having similar dimensions, but on a smaller scale than the primary cavity 20. Pressurized air 81 enters the primary cavity 20, and moves along the walls 21, with the air beginning to rotate along lines 84. Some of the air flow along lines 84 are able to move through the secondary mouth 32 following air flow 86. The secondary cavity 30 has similar dimensions as the primary cavity 20, and the airflow 86 will be directed along the secondary walls 31 to a central pressure point.

Referring now also to FIG. 3, the air flow 86 in the secondary chamber is forced to meet at a central pressure point, with the air pathway 87 directed back out centrally through the mouth 32 to form a small pressure node that protrudes into the confines of the primary cavity 20. The secondary pressure node area 88 causes air pathway 84 to more easily converge with other similar air flow paths to form a higher pressure area pathway 55 that is directed out of the cavity 20 and forward of the leading edge 10. Referring also again to FIG. 5, the secondary cavity may be quite small in comparison to the primary cavity 20, or may be larger in relation, as shown in FIG. 1a and FIG. 2a.

The side walls of multiple cavities are defined using a diminished sine wave configuration. Referring now to FIG. 8 and FIG. 9, diminished sine waves are shown, in which the sine wave 60 follows a mathematical trajectory. For example, using axis x 65 and axis y 61, the diminished sine wave 60 will follow a diminishing wave amplitude where the magnitude of x will be zero at point 63.

The diminished sine wave 60 in FIG. 8 is shown where the angle 64 of maximum wave height is approximately 15 degrees from the y axis 61 to the angled limitation 62, so that the total degree for the maximum wave height is twice that of angle 64, or approximately 30 degrees.

The diminished sine wave 60 in FIG. 9 is shown where the angle 65 of maximum wave height is approximately 22.5 degrees from the Y axis to the angled limitation 62, so that the total degree for the maximum wave height is twice that of angle 65 or approximately 45 degrees.

Referring now to FIG. 10, in which a diminishing sine wave 60 is used to define the structure of the cavity walls in a multiple cavity situation, the sine wave configuration shown in FIG. 8 is seen in the side walls 21, 31 and 41 or cavities 20, 30 and 40. FIG. 10 depicts the use of a diminishing sine wave 60, as used in FIG. 8, to define the wall 21, 31, 41 configuration, where the diminishing sine wave in both Figures decreases in amplitude of x axis 65 along the y axis 61 to point 63. FIG. 11 shows the wall configuration for cavity walls 21, 31, and 41 where a diminishing sine wave, having a greater reduction in amplitude of the x axis 65 along the y axis 61 to point 63 is used. As FIG. 10 shows, a diminishing sine wave 60 with a smaller angle causes multiple cavities 20, 30 and 40 to be elongated, as compared with the diminishing sine wave 60 having a larger angle, as shown in FIG. 11, where the multiple cavities 20 and 30 are not defined as far along the length of the leading edge 10.

FIG. 8 depicts a diminishing sine wave 60, where the angle of maximum wave height is contained within an angle 65 of 22.5 degrees.

Use of multiple cavities is also shown in FIG. 12, in which multiple cavities 20, 30, 40, and 50 are shown, defined on both the forward and aft end of a leading edge 10. The cavity groups on each end may be linked together using a passageway 75 that allows air and/or fluid to pass between each chamber group. This leading edge 10 in FIG. 12 is capable of rapid movement forward or aft, with the passageway capable of being closed off as necessary. In all situations where multiple chambers are used, the secondary cavity, being the cavity that is smaller than the one it is adjoined to, will assist in promoting a pressure node 55 as described for FIG. 1a and FIG. 2a. Where multiple cavities are used, with three or more cavities defined to create a cavity group, the largest cavity 20 will have a secondary cavity 30, with a sub secondary cavity 40 available if so defined, with each successively smaller cavity supporting the larger cavity before it, in providing a means to urge the rapid creation of a pressure node 55.

Referring now to FIGS. 13 and 14, a leading edge 10 is shown, I which a pressure node 55 is defined along a linear distance. The vertical nature of this leading edge 10 would be an example of a bridge support, or other vertical structure. As stated above, the cross sectional view of the pressure node 55 in FIG. 14 would extend along the entire length of the object 10, as shown in FIG. 13, provided that the flow of liquids or gases into the cavities 20 and 30 are at a sufficient rate. The creation of the pressure node 55 is accomplished by allowing the flow of air and/or liquids to move into the cavity 20, where the flow vectors meet and provide an central strip of increased pressure. The pressure node is enhanced by the secondary cavity 30, which allows secondary pressure node to protrude out of the second cavity area into the primary cavity 20. The flow of liquids and gasses as described for FIG. 1a are duplicated with this linear cavity, in that the cross sectional view of FIG. 1a extends the length of the linear cavity in FIGS. 13 and 14. The example of the benefits for this configuration would be clearly seen for use on automobiles, where the cavity configuration would extend linearly and horizontally across the ridge of an automobile, the leading edge of a wing, or extend vertically, as in the instance of a bridge support, which must maintain position against a constant current. In both situations, the linear cavity protects the surface of the object from unnecessary friction caused by turbulence.

This method of creating a pressure node 55 has the ability to provide a smoother transition from subsonic to supersonic. In subsonic speeds, pressure waves flow over and around the leading edge of an object as well as the outer skin 11, with a dramatic increase in turbulence as the speed approached supersonic. As the object breaks through the sound barrier from subsonic to supersonic, the pressure waves tend to flatten out, and are angled from the leading edge of the object, as opposed to flowing around the surface skin 1 of the object from the leading edge on toward the rear. The pressure node 55 provides an artificial extension of the leading edge, that cushions the object itself from the violent turbulence that is consistent with speeds as they move into the supersonic range.

From the foregoing statements, summary and description in accordance with the present invention, it is understood that the same are not limited thereto, but are susceptible to various changes and modifications as known to those skilled in the art and we therefore do not wish to be limited to the details shown and described herein, but intend to cover all such changes and modifications which would be encompassed by the scope of the appended claims.

I claim:

1. A leading edge, where said leading edge defines a linear structure said leading edge comprises a primary cavity extending along the entire length of the leading edge, said primary cavity defined by a first mouth comprising an upper and lower lip opening onto the leading edge and a first inner side wall; said primary cavity has a depth or width that exceeds the width of the first mouth; said first inner side wall comprises a second mouth defined on the back rear side; said second mouth leads to a secondary cavity having a second inner sidewall in a generally spherical shape; said second inner side wall comprises a third mouth defined on the back rear side; said third mouth leads to a third cavity having a third inner sidewall.

2. A leading edge, where said leading edge defines a linear structure, said leading edge comprising a primary cavity extending along the length of the leading edge, said primary cavity defined by a first mouth comprising an upper and lower lip opening onto the leading edge and a first inner side wall; said first inner side wall comprises a second mouth defined on the back rear side; said second mouth leads to a secondary cavity having a second inner sidewall; said primary and secondary cavities are interconnected and continuous wherein said first and second inner side walls follow the configuration of a diminishing sine wave.

* * * * *